United States Patent [19]

Yoshino

[11] Patent Number: 5,479,062
[45] Date of Patent: Dec. 26, 1995

[54] PIEZO ACTUATOR DRIVING CIRCUIT

[75] Inventor: Noriko Yoshino, Kawasaki, Japan

[73] Assignee: Fujitsu Limited, Kawasaki, Japan

[21] Appl. No.: 98,933

[22] Filed: Jul. 29, 1993

[30] Foreign Application Priority Data

Aug. 4, 1992 [JP] Japan .................. 4-206910

[51] Int. Cl.⁶ ................................. H01L 41/08
[52] U.S. Cl. ................. 310/316; 310/317; 310/315
[58] Field of Search ..................... 310/315–318; 318/116

[56] References Cited

U.S. PATENT DOCUMENTS

| | | | |
|---|---|---|---|
| 4,866,326 | 9/1989 | Niikawa et al. | 310/315 |
| 5,204,576 | 4/1993 | Misuyasu | 310/317 |
| 5,208,505 | 5/1993 | Mitsuyasu | 310/317 |
| 5,214,340 | 5/1993 | Suzuki | 310/316 |
| 5,350,962 | 9/1994 | Sakaida et al. | 310/316 |
| 5,376,854 | 12/1994 | Oouchi | 310/316 |

*Primary Examiner*—Mark O. Budd
*Attorney, Agent, or Firm*—Staas & Halsey

[57] ABSTRACT

A driving circuit which drives piezo element connected to a movable member, thereby moving the movable member. A current from a DC power source flows in an induction device. During each drive cycle, a switch mechanism cuts the current in the induction device to induce a driving voltage from the induction device. The switch mechanism cuts the current in the induction device at a first moment in a respective drive cycle occurring when the current is increasing. The driving voltage becomes substantially flat at a second moment during the respective drive cycle occurring after the first moment in the respective drive cycle. A voltage detection device detects the driving voltage induced from the induction device and compares the driving voltage with a predetermined reference level. In accordance with the comparison by the voltage detection device at the second moment during each drive cycle, a control unit determines a first moment for the next drive cycle. More specifically, when the driving voltage is lower than the reference level, the control unit determines the first moment for the next drive cycle to be delayed to cut the current in the induction device at a larger current level. When the driving voltage is larger then the reference level, the control unit determines the first moment for the next drive cycle to be advanced to cut the current in the induction device at a lower current level.

28 Claims, 8 Drawing Sheets

5,479,062

PIEZO ACTUATOR DRIVING CIRCUIT

BACKGROUND OF THE INVENTION

1. Field of the Invention

This invention relates to a driving circuit for a piezo actuator, as an electromechanical transducer, which mechanically drives a pin of impact-type dot-matrix printer.

2. Description of the Related Arts

A piezo element has been promisingly drawing attention as a mean to satisfy the need of high speed actuator used in an impact-type dot-matrix printer head.

However, there is a problem in that the characteristics, particularly capacitance, for a piezo element greatly vary according to its temperature rise. Change in its capacitance value causes voltage variation applied thereto. Accordingly, the mechanical expansion of the piezo element, which is substantially proportional to the applied voltage changes, as well. Accordingly, the mechanical stroke of the pin cannot be always uniform, resulting in non-uniform darkness of the printed dots.

SUMMARY OF THE INVENTION

A piezo actuator driving circuit for driving a piezo element which mechanically drives a mechanical member when applied with a driving voltage thereto, including a DC power source; induction means; switch means for switching a current flowing in the induction means from the DC power source, where upon being cut the current induces the driving voltage from the induction means; a voltage detector for detecting and comparing the driving voltage with a predetermined reference level so as to obtain a compared result; a control circuit for determining a first moment to cut the current with the switch means while the current is increasing according to the compared result at a second moment when the driving voltage is substantially flat after the current is cut, so that upon receiving a result that the driving voltage is lower than the reference level the moment be delayed so as to cut the current at a larger current level, as well as upon receiving a compared result that the driving voltage is higher than the reference level the moment be advanced so as to cut the current at a lower current level. Accordingly, the driving voltage is set substantially equal to the reference voltage for each drive cycle for each piezo element.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 1(a) schematically illustrates an isometric view of a piezo actuator;

Figure 3:
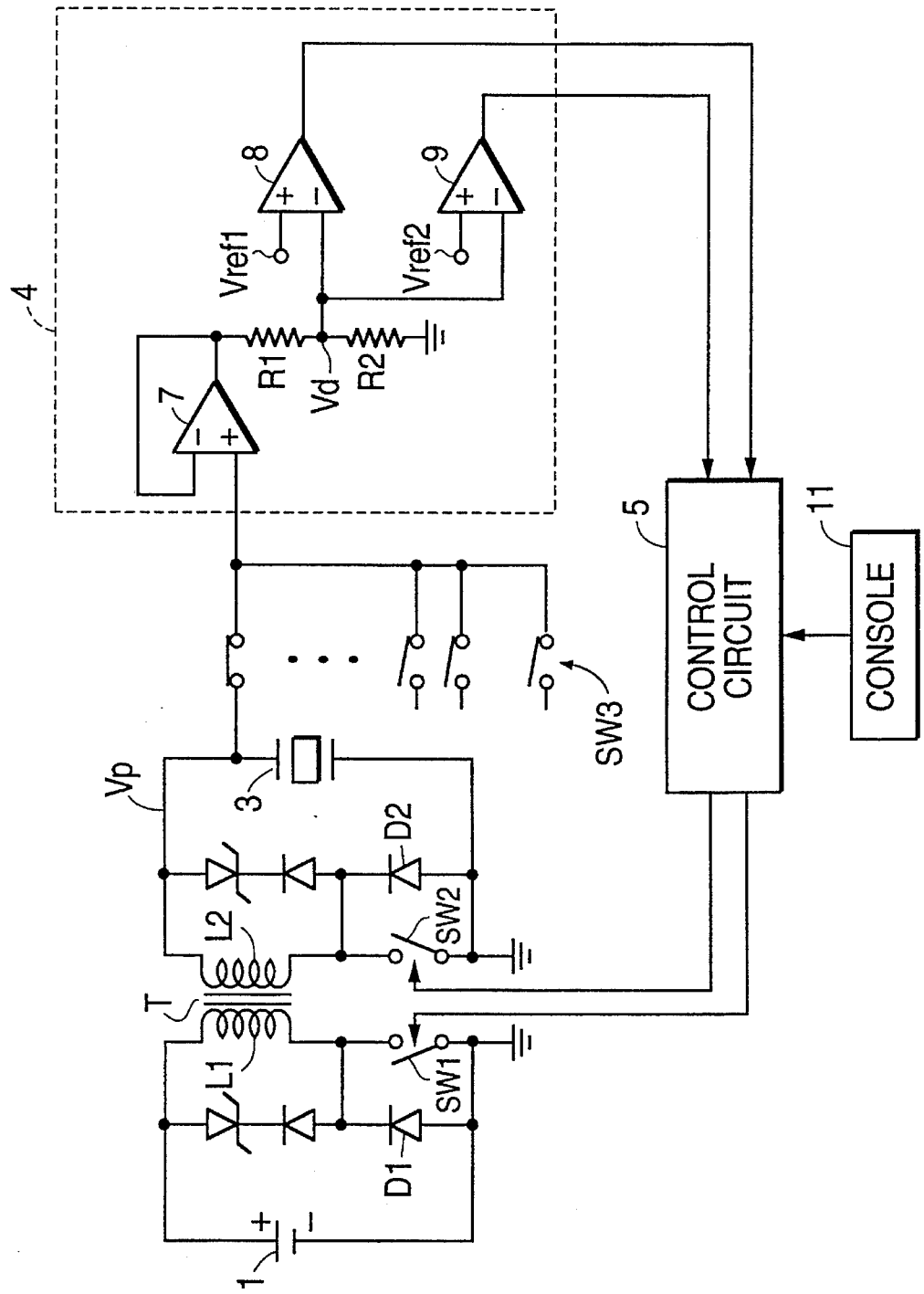
Figure 4:
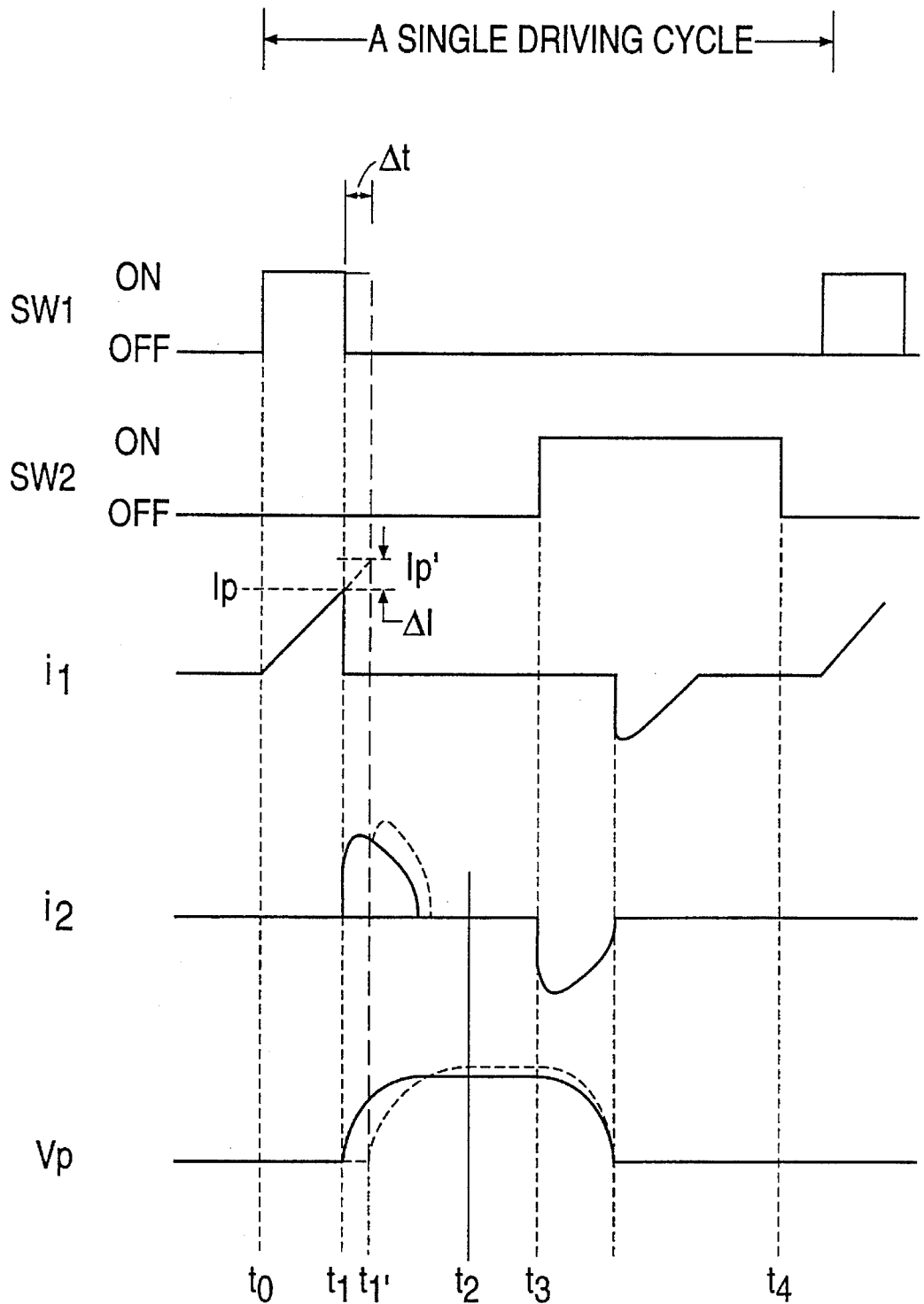
Figure 5:
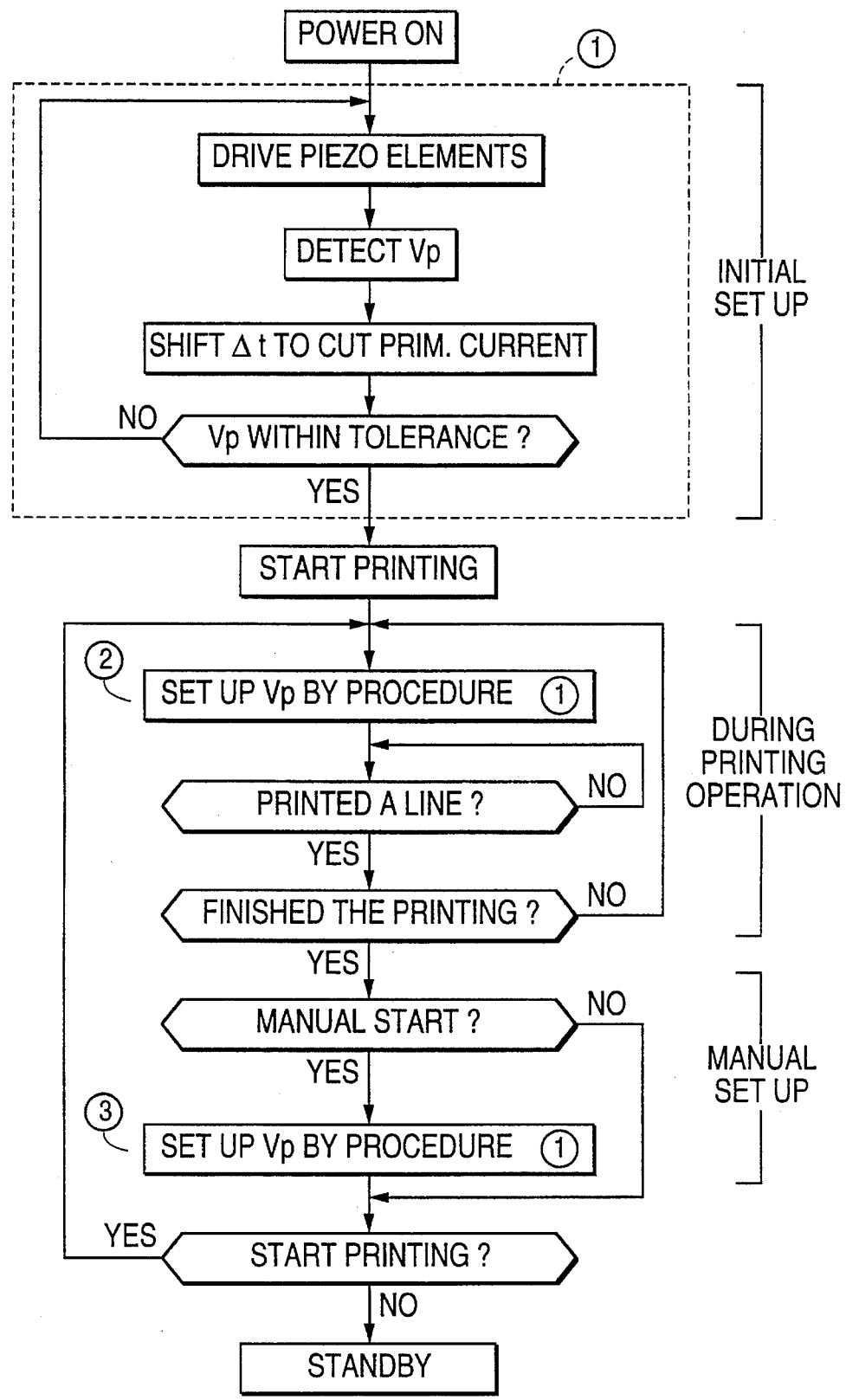
Figure 6:
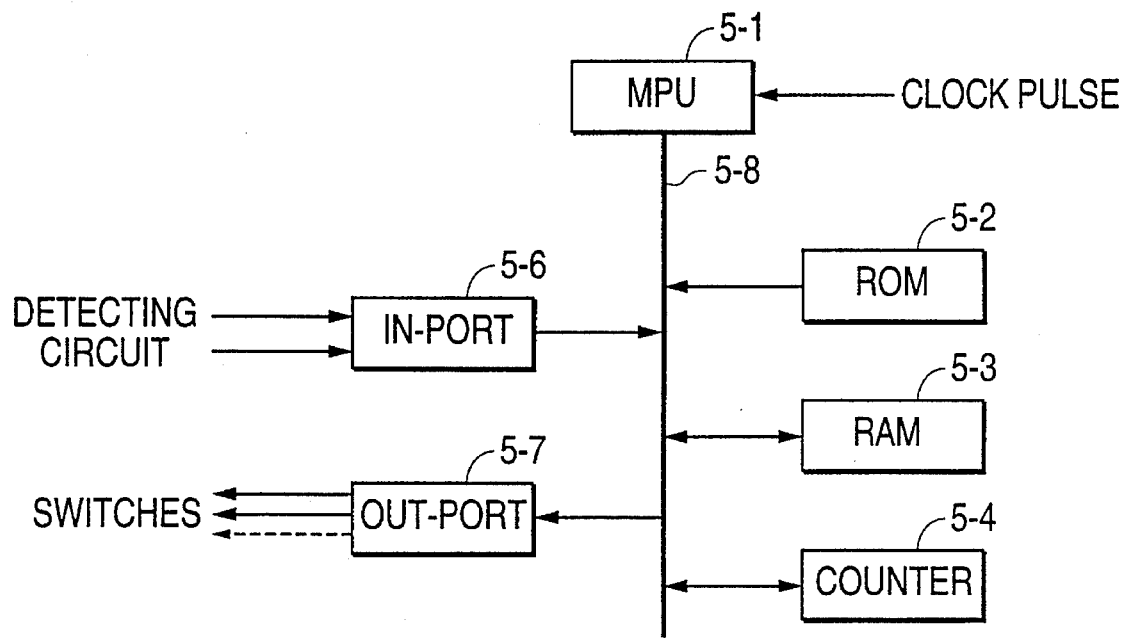
Figure 7:
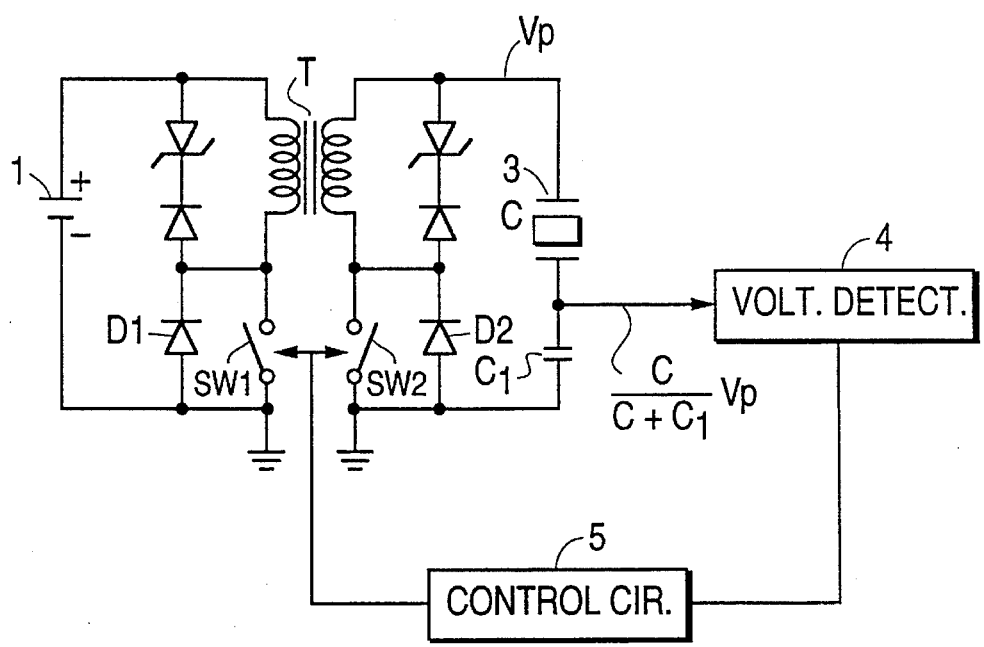
Figure 8:
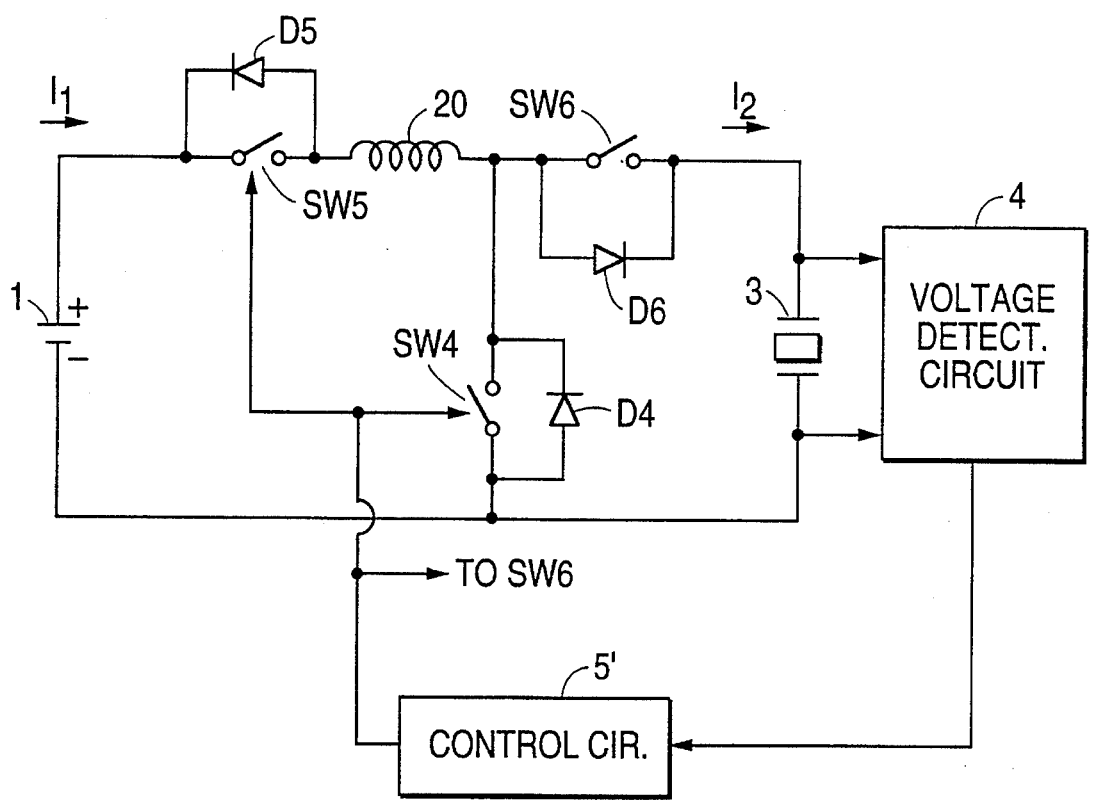
Figure 9:
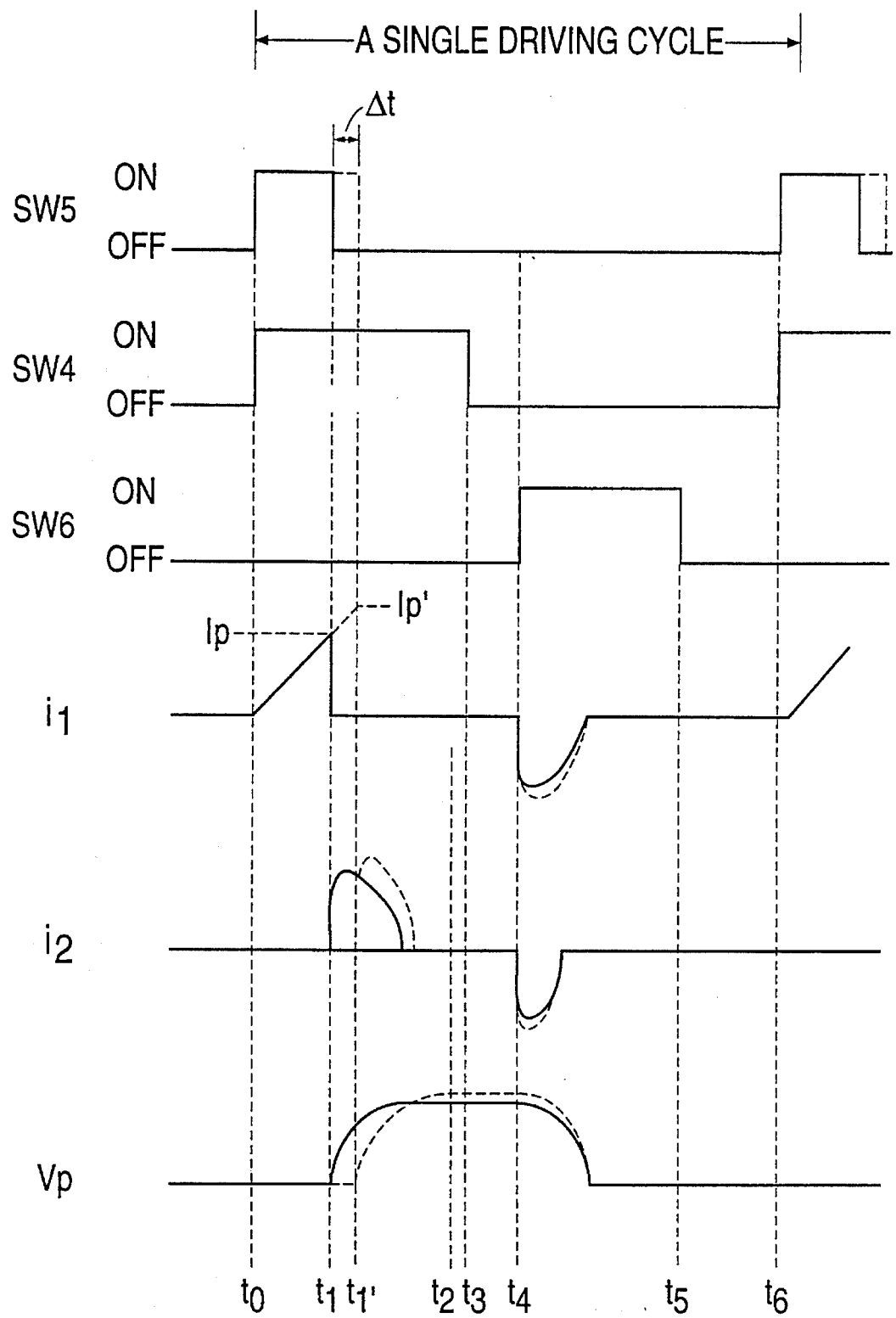

FIG. 3 schematically illustrates a circuit configuration of a first preferred embodiment of the present invention;

FIG. 4 illustrates a time chart of the first preferred embodiment;

FIG. 5 illustrates a flow chart of the first preferred embodiment;

FIG. 6 schematically illustrates a circuit configuration of a control circuit employed in the first and second preferred embodiment of the present invention;

FIG. 7 schematically illustrates a circuit configuration of a second preferred embodiment of the present invention;

FIG. 8 schematically illustrates a circuit configuration of a third preferred embodiment of the present invention; and FIG. 9 illustrates a time chart of the third preferred embodiment.

DESCRIPTION OF THE PREFERRED EMBODIMENT

Figure 1A:
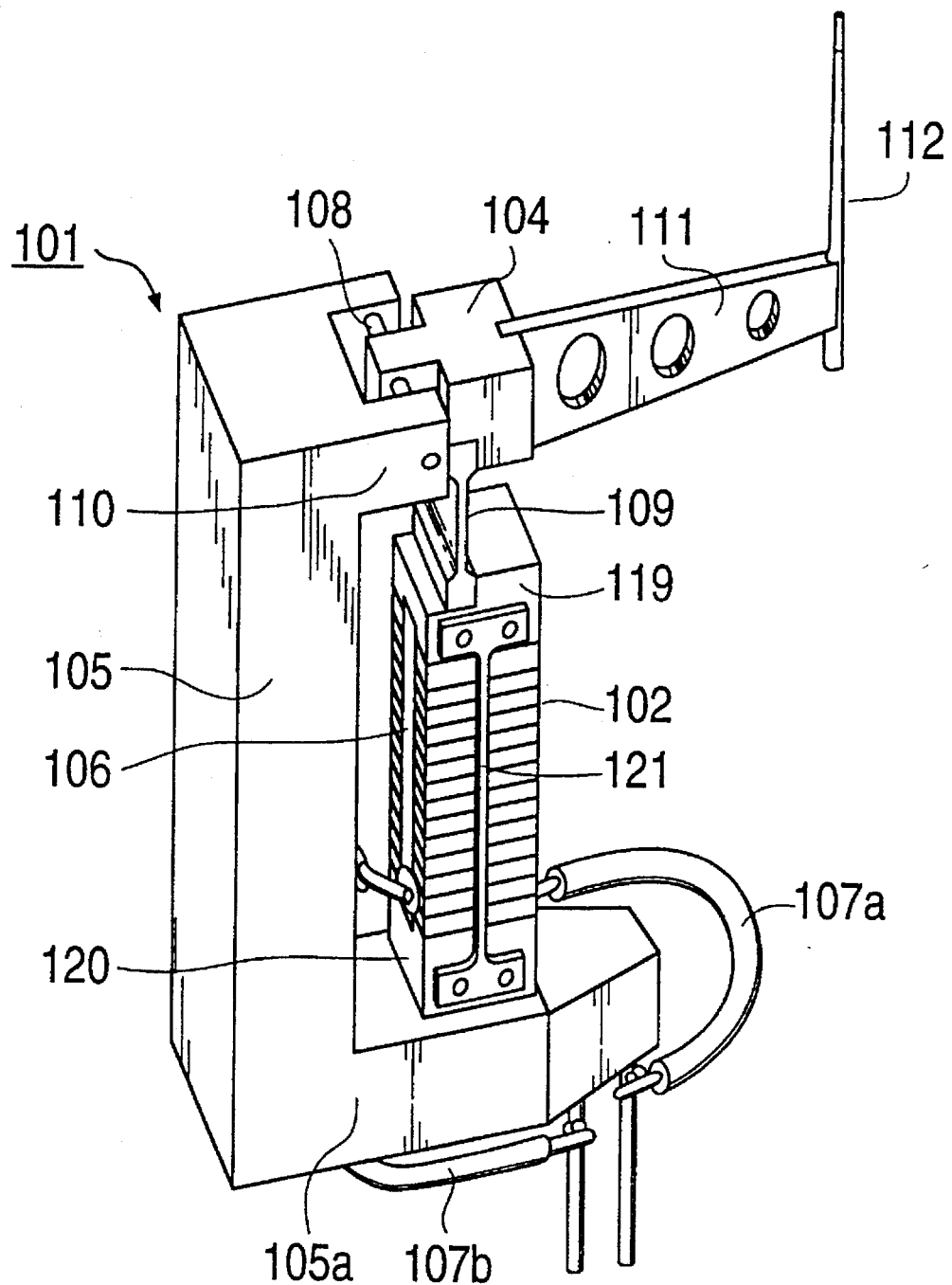
FIG. 1(b) illustrates an equivalent circuit of electrical wiring of the FIG. 1(a) piezo actuator.

Referring to FIG. 1(a), a mechanical portion of a typical piezo actuator 101, where the present invention can be applied, is schematically illustrated.

Figure 1B:
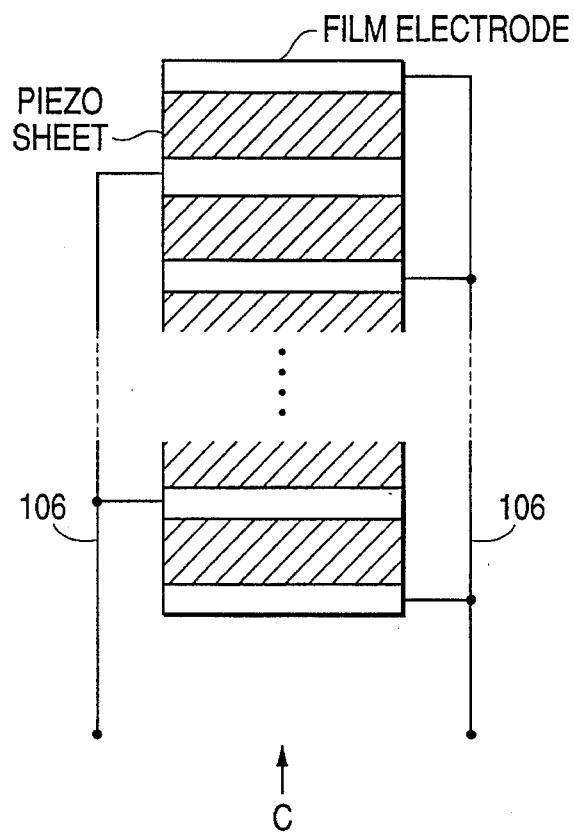

A piezo element 102 is formed of a stack of a plurality of typically 3.0 mm wide×2.7 mm wide×0.1 mm thick sheets of piezoelectric material, typically of composite PZT, i.e. lead-zirconium-titan oxide ceramic, which provides a high electro-strictive coefficient, and film electrodes therebetween. Piezo element 102 and is typically 24 mm high in longitudinally stacked length in total. On two sides of piezo element 102 are coated leads 106. A polarity of a driving voltage is applied via a wire lead 107a and one of coated leads 106 to every other film electrode, and another polarity of the driving voltage is applied via another wire lead 107b and another one of coated leads 106 to the rest of film electrodes. Electrical connection in the piezo element is equivalently shown in FIG. 1(b). When a voltage is applied to the two electrodes having the piezo sheet therebetween, the piezo sheet expands in its thickness direction. Accordingly, piezo element 102, comprising the stack of sheets of piezoelectric material, expands longitudinally. An end of piezo element 102 is fixed via a lower block 120 onto a bent 105a of a frame 105. Another end of piezo element is mechanically connected to an upper block 119. The piezo element is held and longitudinally compressed by a pair of pre-load springs 121, ends of which are respectively fixed to blocks 119 and 120, so that each piezo sheet is appropriately connected with each other.

A pin 112 to strike a sheet to print is held by an end of a beam 111. Another end of beam 111 is fixed on an end of a rotatable block 104. Another end of rotatable block 104 is mounted on a shaft 108, around which block 104 is rotatable. A side of rotatable block 104 is connected via a resilient metal leaf 109 with an upper side of upper block 104 opposite to piezo element 102.

When a driving voltage is applied to piezo element 102, the expansion of piezo element 102 pushes, via resilient metal leaf 109, the rotatable block 104, which then turns around shaft 108. Resilient metal leaf 109 is located much closer to shaft 108 than pin 112; therefore, the expansion of piezo element 102 is amplified to allow a stroke of pin 112 to strike the sheet. The sheet is rolled on a platen. Ink ribbon, if required, is placed between the pin top and the sheet. The sheet, platen and ribbon are not drawn in the figure.

Figure 2:
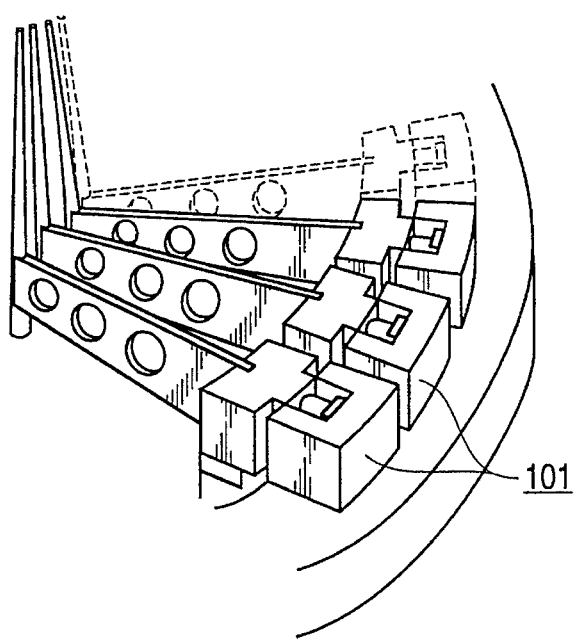
FIG. 2 illustrates a partially broken view of a printer head employing the FIG. 1 actuator.

FIG. 2 shows a broken-out section of a part of an impact type dot-matrix printer head where a plurality, for example twenty-four, of actuators 101 shown in FIG. 1(a) are assembled.

Referring to FIGS. 3 to 5, a circuit configuration, a time chart and a flow chart, respectively, of a first preferred embodiment of the present invention is hereinafter described. The notation T denotes a transformer having a primary winding L1 wound on a ferrite core and a secondary winding L2 also wound on the core. A first switch SW1 is provided to connect a DC (direct current) power supply 1 of, for example 40 V, to primary winding L1 of transformer T. When first switch SW1 is closed at a time $t_0$, a current starts gradually, almost linearly, to flow from DC power supply into the primary winding due to a high inductance value of the primary winding. When first switch 1 is opened at a moment $t_1$ (referred to hereinafter as a first moment), for example, 30 µS measured after first switch SW1 was closed, at a current value $I_p$, while the current is increasing, a transient voltage is induced at output terminals of secondary winding L2. First moment $t_1$ will be explained later in detail. This induced voltage is applied via a diode D2 to piezo element 3 according to a capacitance value of the load of the secondary winding as explained below. The material PZT forming the piezo element is of not only a high electrostrictive coefficient material but also a ferroelectric material. Accordingly, piezo element 3 is capacitive as equivalently denoted with C as high as 450 nF. Accordingly, a secondary current supplied from the secondary winding charges via diode D2 the capacitance C of piezo element 3, where this charge generates a voltage of typically 100 V across the capacitance C. Thus, the electromagnetic energy of the primary current $I_p$ is transferred to an electrostatic energy to generate a voltage across capacitance C of the piezo element. This generated voltage is the driving voltage Vp, which then causes the expansion of the piezo element.

Value of thus generated voltage Vp is determined according to the following formulas.

Electromagnetic energy $W_L$ stored in the inductance L1 of the transformer is:

$$W_L = (½) \times L1 \times Ip^2 (J) \qquad (1)$$

where

L1: inductance of the primary winding; and

Ip: primary current at the moment when cut.

Thus, stored energy $W_L$ is transferred from the secondary winding to the capacitance charge.

Electrostatic energy $W_C$ stored in the capacitance C of the piezo element is:

$$W_C = (½) \times C \times Vp^2 (J) = W_L \qquad (2)$$

Therefore, $$Vp = (L1/C)^{1/2} \times Ip \qquad (3)$$

Thus, the voltage generated across the capacitance varies proportionally to the inverse of the capacitance value, as shown by above formula (2). On the other hand, as described in the related arts, the capacitance C of the piezo element varies depending on temperature rise, etc.

In order to achieve a constant stroke of the pin, i.e. the expansion of the piezo element, the driving voltage Vp has to be kept constant regardless to the capacitance change. The present invention provides a driving circuit that keeps the driving voltage constant, for example, about 100 V.

A voltage detector circuit 4 includes, for example, an operational amplifier 7 and two comparators 8 and 9, An input terminal of first operational amplifier 7 is connected to a hot terminal (opposite from the ground) of piezo element 3. Another input terminal is connected to an output terminal of amplifier 7 so as to form a unity-gain amplifier having a high input impedance. An output voltage of amplifier 7 is divided by two resistors R1 and R2, for example each 50 kΩ. A first comparator 8 compares the divided voltage $V_d = (R_2/R_1+R_2)V_p$ with a first reference level $V_{ref1}$, for example 50 V, which corresponds to a half of a highest limit of tolerance of the driving voltage Vp. A second comparator 9 compares the divided voltage $V_d$ with a second reference level $V_{ref2}$, for example 40 V, which corresponds to a half of a lowest limit of the tolerance of the driving voltage Vp. First comparator 8 outputs to a control circuit 5 a binary signal, for example L, indicating that the input signal is higher than the upper limit. Second comparator 9 outputs to a control circuit 5 a binary signal, for example H, indicating that the input signal is lower than the lower limit.

The binary signals input from comparators 8 and 9 are checked by control circuit 5 at a second moment $t_2$, for example, 70 µs measured after $t_0$, chosen appropriately at a second moment when the driving voltage becomes substantially steady after the charging to capacitor C is finished.

Upon receiving signal H from second comparator 9 to inform that the driving voltage on the piezo element is lower than the tolerance, control circuit 5 instructs first switch SW1 to open at a shifted moment t1' which is Δt later than first moment $t_1$, for the next pin driving cycle. Because the current in the primary winding is rising still then due to its high inductance value, the current value Ip' cut at the shifted moment $t_1$' is ΔI larger than the current value Ip cut at first moment $t_1$. This increased primary current Ip' provides larger electromagnetic energy in the transformer, and accordingly generates higher driving voltage across the piezo element than the previous primary current $I_1$.

Upon receiving signal L from first comparator 8 to inform that the driving voltage is higher than the tolerance, control circuit 5 instructs first switch SW1 to open at a moment which is Δt earlier than first moment $t_1$, for the next pin driving cycle. The current value cut at this moment is lower than the current value Ip cut at first moment $t_1$. This decreased primary current generates lower driving voltage across the piezo element than the previous current Ip. Time chart of the latter case is not drawn in FIG. 4, because the operation principle is quite the same as the former case where the driving voltage is lower than the tolerance. The shift period Δt is chosen, for example, 5 µs, where after several repetition of the pin driving operation the driving voltage can be set within the tolerance, i.e. 40 V–50 V.

Operation of control circuit 5 is performed with a digital micro processor unit (referred to hereinafter as a MPU) and memory devices, etc. Circuit configuration of control circuit will be described later in detail.

After the driving voltage is detected by voltage detection circuit 4, at a third moment t3, for example, 100 µs measured after the close time $t_0$ of first switch SW1, which corresponds to substantially a half of pin driving cycle, second switch SW2 is instructed to close by control circuit 5, so that the charge stored in the capacitance C of the piezo element is discharged via secondary winding L2. Then, the expanded piezo element returns to its original dimension. At an appropriate time $t_4$ after the discharge current is completely finished, second switch SW2 is opened again. The timing to close and open second switch SW2 is generally constant regardless to the time shift of the first moment $t_1$.

Next, at a moment $t_5$, for example, 200 µs measured from the previous closing of first switch SW1, first switch SW1 is closed again for the next driving cycle instructed by control circuit 5. This cycle time 200 µs is preferably chosen so as to correspond to mechanical resonance, approximately 5 kHz, of the piezo actuator including piezo element 2, resilient leaf 104, upper block 104, beam 111 and pin 112.

First and second switches SW1 and SW2 are generally formed of transistors. A diode D1 connected in parallel to first switch SW1, and a diode D2 connected in parallel to second switch SW1 are to allow transient currents, which are opposite to the direction of ordinary driving current, to flow therein. A series connection of a diode and a Zenor diode is connected in parallel to the terminals of the primary winding and secondary winding respectively, so as to protect the transistors used as the first and second switches from excessively high voltages applied thereto, respectively.

Though in the above description the voltage detection circuit 4 and the control circuit 5 are explained to be provided for each piezo element, a third switch SW3 may be provided between the input terminal of amplifier 7 and each of piezo element 3, so that a single set of the voltage detection circuit 4 and the control circuit 5 can selectively, i.e. sequentially, control a plurality of piezo elements. In this configuration, the control circuit memorizes the data, i.e. the first moment $t_1$ of the previous cycle, of each piezo element.

Before the printer employing the piezo actuator of the present invention actually starts practical printing operation, the printer head is preferably moved to a dummy area where no print will be done. Then, the above-describe actuator driving cycle is repeated for several times to setup proper driving voltage, as an initial setup procedure as shown with ① in the FIG. 5 flow chart.

As an alternative of this kind of setup procedure, the printer head may stay at a real region to be printed thereon; however, the level of driving voltage Vp is tentatively lowered adequately for the pin not to really strike the sheet. In this tentative procedure, the scattered driving voltages of each piezo element can be found so that proper value of practical driving voltage can be obtained with a minor adjustment of thus tentatively found driving voltage.

During the printing operation, the capacitance value of each piezo element varies due to its temperature rise. Therefore, the driving voltage is further adjusted at a predetermined interval, for example, at each print line, according to the present invention as shown with procedure ② in FIG. 5 flow chart. Though the above-described procedures are automatically carried out according to a program installed in the control circuit 5, the driving voltage setup procedure can be initiated by a manual operation of an operator input from a console 11, as shown with procedure ③ in the FIG. 5 flow chart.

A typical circuit configuration of control circuit 5 is schematically illustrated in FIG. 6. A commercially available micro-processor unit (MPU) 5-1 is connected via a bus 5-8 with a read-only-memory (ROM) 5-2, a random-access-memory (RAM) 5-3, a counter (5-4), an input port 5-6 and an output port 5-7. A program to determine the above-described operations and the tolerance data of driving voltage, etc. have been stored in ROM 5-2. Result data sent from comparators 8 and 9 are input via input port 5-6 to MPU 5-1. Clock pulses input to MPU 5-1 are counted by counter 5-4 to act as a timer, which counts the first moment $t_1$, etc. The value of first moment $t_1$ of the previous cycle has been stored in RAM 5-3, and according to the data input from input port 5-6 MPU calculates the time of shifted moment $t_1'$ for the next cycle. This calculated data is stored again in RAM for the next-next cycle. The MPU instructs third switch SW3 to scan all the piezo elements responsible to control. The MPU also instructs itself to carry out the above process at the third moment $t_3$ and the fourth moment $t_4$ to close and open second switch SW2, and the moment to start the next cycle.

Referring to FIG. 7, a second preferred embodiment of the present invention is hereinafter described. A capacitor $C_1$ having a capacitance value $C_1$ of for example, 4050 nF, is additionally connected between ground terminal of, piezo element 3 and the ground level, so that the driving voltage Vp is divided 1/10 in proportion of impedance ratio of the capacitance C of piezo element. This divided voltage is detected at the hot terminal of the added capacitor $C_1$. When the capacitance value of the added capacitor $C_1$ is chosen much higher than that of the piezo element, the voltage loss by the added capacitor $C_1$ is negligible. The two reference levels $V_{ref1}$ and $V_{ref2}$ are appropriately chosen to meet the division ratio.

Referring to FIGS. 8 and 9, a third preferred embodiment of the present invention is hereinafter described. In FIG. 9, the notations $t_0$, $t_1$, etc. denote the moments denoted with the same notations in FIG. 4. The transformer T in the first preferred embodiment is replaced with a single inductor 20, which is of a generally-called switching regulator configuration. A fourth switch SW4 is connected between an output terminal of inductor 20 and a ground level. A fifth switch SW5 is connected between the output terminal of inductor 20 and piezo element 3. A sixth switch SW6 is connected between the power supply and an input terminal of inductor 20.

Having sixth switch SW6 opened; fourth switch SW4 and fifth switch SW5 are closed at a moment $t_0$ so that a current supplied from DC power supply starts to gradually increase its flow in inductor 20. At a first moment $t_1$ while the current is still increasing, fourth SW4 is opened so as to induce a high voltage at the output terminal. This induced voltage, plus the DC voltage, is applied via diode D6 connected in parallel to sixth switch SW6 to piezo element so as to generate a driving voltage across the capacitance of the piezo element in the same way as the first preferred embodiment. At a second moment $t_2$ when the driving voltage has become substantially steady, the driving voltage Vp detected by voltage detection circuit 4 is compared with reference voltages each of which corresponds to the upper and lower limits of the tolerance of the driving voltage. Subsequently, at a third moment $t_3$ (defined hereinafter differently from those of the first preferred embodiment) fourth switch SW4 is opened. At a fourth moment $t_4$ which is substantially at a half of driving cycle, sixth switch SW6 is closed so as to discharge the charge of the capacitance of piezo element 3 via reactor 20, diode D5, power source 1. After the discharging is finished, an overshoot caused from reactor 20 is clamped by diode D4. Sixth switch SW6 is opened. Diodes D4, D5 and D6, each connected in parallel to fourth, fifth and sixth switches SW4, SW5 and SW6 also protect those switches formed of transistors from excessive voltages applied inversely thereto, respectively.

Function of control circuit 5', that is to instruct how the first moment $t_1$ be shifted by shift period $\Delta t$, is basically the same as the control circuit 5 of the first preferred embodiment, where the difference is only in that the instructions are output to three switches, instead of two switches.

It is apparent that the capacitor divider of the driving voltage in the second preferred embodiment may be applied to the third preferred embodiment, as well.

Though in the above preferred embodiments the adjustment of the driving voltage is carried out by shifting the moment to cut the input (primary) current by a constant shifting period $\Delta t$, it is apparent that there may be provide a analog/digital converter in place of the two comparator so that the MPU compares the input digital value of the driving voltage with a digital reference voltage level by means of a program installed therein in advance. The program may be arbitrarily such that the shift period $\Delta t$ corresponds to the amount of deviation of the detected driving voltage from the reference voltage, for example, in proportion to the deviation.

According to the present invention, the scattered capacitance value of each piezo element generated in its production process, or caused from its temperature change or its secular change, can be compensated by the application of the constant driving voltage. Changes in other characteristics are minor compared with the effect of the capacitance.

Consequently, the printing force, i.e. stroke, of the pin can be kept constant during the printing operation as well as a long run operation so that a uniform darkness of the printed dots.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications or equivalents may be resorted to, falling within the scope of the invention.

What I claim is:

1. A piezo actuator driving circuit for a piezo element which mechanically drives a mechanical member on being applied with a driving voltage thereto, comprising:

a DC power source;

induction means;

switch means for controlling a current flowing in said induction means from said DC power source, upon being cut said current inducing said driving voltage from said induction means;

voltage detection means for detecting and comparing said driving voltage with a predetermined reference level so as to output a compared result;

control means for determining a first moment to cut said current with said switch means while said current is increasing according to said compared result at a second moment when said driving voltage is substantially flat after said current is cut, such that upon receiving a result that said driving voltage is lower than said reference level said first moment is delayed so as to cut said current at a larger current level, as well as upon receiving a compared result that said driving voltage is higher than said reference level said first moment is advanced so as to cut said current at a lower current level, whereby said driving voltage is set substantially equal to said reference voltage for each drive cycle.

2. A piezo actuator driving circuit as recited in claim 1, wherein said mechanical member comprises a pin to strike a sheet to print.

3. A piezo actuator driving circuit as recited in claim 1, further comprising:

a switch for selectively connecting one of a plurality of said piezo elements to said voltage detection means.

4. A piezo actuator driving circuit as recited in claim 1, further comprising:

a capacitor connected in series to said piezo element so as to divide said driving voltage, said divided driving voltage generated across said capacitor being input to said voltage detection means.

5. A piezo actuator driving circuit as recited in claim 1, wherein said voltage detection means comprises two of said reference level, respectively for an upper limit and a lower limit of a tolerance of said driving voltage.

6. A piezo actuator driving circuit as recited in claim 1, wherein said induction means is a transformer having a primary winding and secondary winding;

said switch means comprises a first switch for supplying a current from said DC power source to said primary winding, upon opening said first switch to cut said current said driving voltage being induced from said secondary winding;

said piezo actuator driving circuit further comprises a second switch for discharging electric charge charged across the piezo element by said driving voltage; and said control circuit instructs said first moment to said first switch to open.

7. A piezo actuator driving circuit as recited in claim 1, wherein said induction means is an inductor having an input terminal and an output terminal;

said switch means comprises
      a first switch connected between said DC power source and said input terminal, and
      a second switch connected between said output terminal and a ground;

said piezo actuator driving circuit further comprises a third switch, upon opening said second switch of said switch means to cut said current, said driving voltage being induced from said output terminal so as to be applied via said third switch onto said piezo element, a charge across said piezo element being discharged via said first and second switches of said switch means when both closed; and said control circuit instructs said first moment to said second switch of said switch means to open.

8. A piezo actuator driving circuit as recited in claim 1, wherein said control circuit comprising a digital processor, a memory device, a clock and a counter.

9. A piezo actuator driving circuit as recited in claim 8, wherein operation of said control circuit is according to a program installed in said control circuit.

10. A piezo actuator driving circuit as recited in claim 8, wherein said control circuit further stores a value of said first moment to be set for each piezo element.

11. A piezo actuator driving circuit as recited in claim 1, wherein driving voltage setting operation is carried out once for predetermined printing cycles.

12. A piezo actuator driving circuit as recited in claim 1, wherein said driving voltage setting operation is carried out at least before starting an actual printing operation of the piezo element, with an adequately low driving voltage for said piezo element not to actually print; said moment thus determined is kept constant for predetermined subsequent printing cycles without repeating said driving voltage setting operation.

13. A piezo actuator driving circuit as recited in claim 1, wherein said driving voltage setting operation is carried out at least before starting an actual printing operation of the piezo element at an area on which no printing is really carried out, said moment thus determined is kept constant for predetermined subsequent printing cycles without repeating said driving voltage setting operation.

14. A driving circuit for driving a piezo element with a driving voltage during respective drive cycles of sequential drive cycles, the driving circuit comprising:

a DC power source;

an induction device connected to the DC power source, a current flowing in the induction device from the DC power source during each drive cycle and having a period of increasing current during each drive cycle;

a switch mechanism which, during each drive cycle, cuts the current in the induction device to induce a driving voltage from the induction device in the respective drive cycle, the switch mechanism cutting the current in the induction device at a first moment in the respective drive cycle occurring when the current is increasing, the driving voltage becoming substantially flat at a second moment during the respective drive cycle occurring after the first moment in the respective drive cycle;

a voltage detection device detecting the driving voltage induced from the induction device, comparing the driving voltage with a predetermined reference level, and producing a corresponding output signal indicating the result of the comparison; and a control unit receiving the output signal of the voltage detection device and determining, in accordance with the received output signal at the second moment of a respective drive cycle, a first moment for the next drive cycle, wherein when the received output signal indicates that the driving voltage is lower than the reference level, the control unit determines the first moment for the next drive cycle to be delayed to cut the current in the induction device at a larger current level, and when the received output signal indicates that the driving voltage is larger then the reference level, the control unit determines the first moment for the next drive cycle to be advanced to cut the current in the induction device at a lower current level.

15. A driving circuit as recited in claim 14, wherein the driving circuit drives the piezo element to move a mechanical member, the mechanical member comprising a pin to strike a sheet.

16. A driving circuit as recited in claim 14, further comprising:

a switch for selectively connecting one of a plurality of piezo elements to the voltage detection device.

17. A driving circuit as recited in claim 14, further comprising:

a capacitor connected in series to the piezo element to divide the driving voltage and generate a divided driving voltage across the capacitor, the divided driving voltage being the driving voltage detected by the voltage detection device.

18. A driving circuit as recited in claim 14, wherein the voltage detection device compares the driving voltage to a first reference level to detect an upper level of the driving voltage, and compares the driving voltage to a second reference level to detect a lower level of the driving voltage.

19. A driving circuit as recited in claim 14, further comprising a discharging switch for discharging voltage charged across the piezo element by the driving voltage, wherein the induction device is a transformer having a primary winding and secondary winding, and the switch mechanism comprises a first switch having a first position and a second position, the first switch settable in the first position to supply current from the DC power source to the primary winding and settable in the second position to cut the current from the DC power source to the primary winding to induce the driving voltage in the secondary winding, the control unit controlling the switch mechanism to set the first switch in the second position at the first moment during each respective drive cycle.

20. A driving circuit as recited in claim 14, wherein:

the induction device is an inductor having an input terminal and an output terminal; and the switch mechanism comprises a first switch connected between the DC power source and the input terminal of the induction device, and a second switch connected between the output terminal of the induction device and ground, the second switch being opened to cut the current between the output terminal of the induction device and ground and induce the driving voltage from the output terminal of the induction device, and being closed to allow current to flow between the output terminal of the induction device and ground, the control unit controlling the second switch to close at the first moment during each respective drive cycle, the driving circuit further comprising a third switch which, upon opening the second switch of the switch mechanism, the driving voltage is applied to the piezo element via the third switch, a charge across the piezo element being discharged when the first and second switches of the switch mechanism are both closed.

21. A driving circuit as recited in claim 14, wherein the control unit comprises a digital processor, a memory device, a clock and a counter.

22. A driving circuit as recited in claim 21, wherein the control unit operates in accordance with a program stored therein.

23. A driving circuit as recited in claim 21, wherein the driving circuit drives a plurality of piezo elements and the control unit stores a value of the first moment for each drive cycle to be set for each piezo element.

24. A driving circuit as recited in claim 14, wherein a driving voltage setting operation is performed once for predetermined printing cycles.

25. A driving circuit as recited in claim 14, wherein the driving circuit drives the piezo element to perform a print operation and, prior to the print operation, the control unit determines the first moment for a respective drive cycle by using an adequately low driving voltage so that the driving circuit does not cause an actual print, the control unit thereafter keeping the first moment constant for drive cycles during the print operation.

26. A driving circuit as recited in claim 14, wherein the driving circuit drives the piezo element to perform a print operation and, prior to the print operation, the control unit determines the first moment for a respective drive cycle, the control unit thereafter keeping the first moment constant for drive cycles during the print operation.

27. A printer which drives a piezo element with a driving voltage during respective drive cycles of sequential drive cycles, to move a movable member and cause a printing operation, the printer comprising:

a DC power source;

an induction device connected to the DC power source, a current flowing in the induction device from the DC power source during each drive cycle and having a period of increasing current during each drive cycle;

a switch mechanism which, during each drive cycle, cuts the current in the induction device to induce a driving voltage from the induction device in the respective drive cycle, the switch mechanism cutting the current in the induction device at a first moment in the respective drive cycle occurring when the current is increasing, the driving voltage becoming substantially flat at a second moment during the respective drive cycle occurring after the first moment in the respective drive cycle;

a voltage detection device detecting the driving voltage induced from the induction device, comparing the driving voltage with a predetermined reference level, and producing a corresponding output signal indicating the result of the comparison; and a control unit receiving the output signal of the voltage detection device and determining, in accordance with the received output signal at the second moment of a respective drive cycle, a first moment for the next drive cycle, wherein when the received output signal indicates that the driving voltage is lower than the reference level, the control unit determines the first moment for the next drive cycle to be delayed to cut the current in the induction device at a larger current level, and when the received output signal indicates that the driving voltage is larger then the reference level, the control unit determines the first moment for the next drive cycle to be advanced to cut the current in the induction device at a lower current level.

28. A printer as in claim 27, further comprising:

a piezo element to which the driving voltage is applied; and a movable member connected to the piezo element to allow the movable member to move in accordance with the driving voltage applied to the piezo element.

* * * * *

UNITED STATES PATENT AND TRADEMARK OFFICE
CERTIFICATE OF CORRECTION

PATENT NO. : 5,479,062
DATED : December 26, 1995
INVENTOR(S) : Noriko YOSHINO

It is certified that error appears in the above-indentified patent and that said Letters Patent is hereby corrected as shown below:

Column 2, line 37, after "element", insert --102--.

Column 4, line 38, delete "-" and insert therefor

------ (double dash).

Column 5, line 62, after "of", insert a comma (",").

Line 63, after "of", delete the comma (",").

Column 7, line 15, after "for", insert --driving--.

Signed and Sealed this

Second Day of April, 1996

Attest:

BRUCE LEHMAN

*Attesting Officer*     *Commissioner of Patents and Trademarks*